United States Patent [19]

Hunter

[11] Patent Number: 5,104,595

[45] Date of Patent: Apr. 14, 1992

[54] PROCESS AND APPARATUS FOR IN SITU REHABILITATION OF PIPELINES

[76] Inventor: Robert M. Hunter, 320 S. Willson Ave., Bozeman, Mont. 59715

[21] Appl. No.: 553,430

[22] Filed: Jul. 13, 1990

[51] Int. Cl.$^5$ ............... B29C 47/06; B29C 63/34
[52] U.S. Cl. ............... 264/33; 118/DIG. 10; 138/145; 264/35; 264/514; 264/564; 264/573; 264/209.2; 264/209.3; 425/13; 425/326.1; 425/380
[58] Field of Search ............... 264/516, 512, 36, 269, 264/563, 564, 515, 173, 209.2, 209.3, 31, 33, 35, 514, 570, 573; 425/262, 13, 326.1, 376.1, 380; 156/94, 287, 294; 138/97, 145; 118/DIG. 10

[56] References Cited

U.S. PATENT DOCUMENTS

| | | | |
|---|---|---|---|
| 2,632,205 | 3/1953 | Fitz Harris | 264/173 |
| 3,122,786 | 3/1964 | Huisman | 425/262 |
| 3,376,181 | 4/1968 | Larson et al. | 264/150 |
| 3,560,295 | 2/1971 | Kimbrell et al. | 156/294 |
| 3,720,557 | 3/1973 | Longoni et al. | 264/515 |
| 4,207,130 | 6/1980 | Barber | 156/287 |
| 4,233,101 | 11/1980 | Scragg et al. | 156/287 |
| 4,308,824 | 1/1982 | Muta et al. | 118/713 |
| 4,371,569 | 2/1983 | Muta et al. | 427/230 |
| 4,386,628 | 6/1983 | Stanley | 183/97 |
| 4,419,163 | 12/1983 | Yamamoto et al. | 156/94 |
| 4,496,499 | 1/1985 | Brittain et al. | 264/36 |
| 4,640,313 | 2/1987 | Stanley | 138/141 |
| 4,773,450 | 9/1988 | Stanley | 138/98 |
| 4,777,984 | 10/1988 | Storah | 138/98 |
| 4,867,921 | 9/1989 | Steketee | 264/36 |
| 4,925,381 | 5/1990 | Aoki et al. | 425/375 |

OTHER PUBLICATIONS

Hunter, R. M. and Stephens, J. E., System for In Situ Pipeline Rehabilitation, Jul. 1990, pp. 9-13.

*Primary Examiner*—Jan H. Silbaugh
*Assistant Examiner*—Mathieu Vargot
*Attorney, Agent, or Firm*—Dann, Dorfman, Herrell and Skillman

[57] ABSTRACT

Underground pipelines that carry wastewater water, natural gas and industrial fluids deteriorate with age. Shown is a process and apparatus for installing a thermoplastic liner in such existing pipelines to accomplish in situ rehabilitation. It involves extruding a tube of thermoplastic liner material within the interior of a pipeline in situ, said tube having an outside diameter smaller than the inside diameter of said pipeline. The tube is next expanded so that the outside diameter of said tube is essentially equal to the inside diameter of said pipeline. The expanded tube is then cooled and hardened in a liner configuration.

2 Claims, 2 Drawing Sheets

PROCESS AND APPARATUS FOR IN SITU REHABILITATION OF PIPELINES

This invention was made with Government support under Grant No. ISI-8961257 awarded by the National Science Foundation. The Government has certain rights in the invention.

This application discloses a process and an apparatus that were discovered, in part, during research funded by the United States National Science Foundation (NSF). Aspects of the invention are described in detail in a report entitled "System for In Situ Rehabilitation of Pipelines" prepared for the NSF by Yellowstone Environmental Science, Inc., Bozeman, Mont., July 1990.

This invention relates to a process and apparatus for installing a thermoplastic liner in existing pipelines and more particularly to a process and apparatus for in situ rehabilitation of pipelines.

THE STATE OF THE ART

Underground pipelines comprise water lines, natural gas lines, sewers and pipelines that carry a variety of industrial fluids. Deterioration of sewers is a particularly serious problem and it is that problem that this disclosure specifically addresses. The rehabilitation method and apparatus described herein could, however, be used for rehabilitation of any pipeline.

A serious infrastructure deterioration problem is facing communities across America. A significant part of America's investment in infrastructure is its sanitary sewer systems. Deterioration of sanitary sewer systems is evidenced by the occurrence of excessive infiltration of ground water and inflow of storm water (I/I). Hundreds of millions of dollars are expended annually by communities attempting to isolate and eliminate these extraneous flows to their sanitary sewer systems.

Over 20 percent of the energy consumed by wastewater conveyance, treatment, and disposal is directly related to the amount, and not the strength, of wastewater processed. It is estimated that over 15 percent of the flow in municipal wastewater systems is contributed by infiltration of groundwater and storm water inflow. These extraneous inflows of relatively clean water take up capacity in municipal wastewater systems and increase their energy demands. The U.S. Environmental Protection Agency estimates that about one third of the I/I entering municipal wastewater systems could be eliminated cost-effectively.

While I/I is a serious symptom of sewer deterioration, it is also a contribution factor to catastrophic structural failure. Typically, infiltration washes bedding material into the leaking pipeline, thereby placing further stress on the structure. For these reasons, in situ rehabilitation of pipelines by lining is important.

Prior art methods for lining pipelines in situ have a number of limitations that are overcome by the present invention. Lining methods that utilize thermoset liner materials produce liners that are relatively rigid and subject to shear failure. This is because the thermoset plastics most commonly used in lining applications are capable of much less elongation prior to breaking under tension than thermoplastic materials used in lining applications. Furthermore, lining methods that utilize thermoset materials are relatively expensive.

Prior art methods that utilize thermoplastic liner materials also have limitations. In one method, a cooled and hardened tubular liner is inserted into a pipeline in a folded configuration so as to effectively reduce its outside diameter. Then, the liner is heated and expanded by pressurizing the interior of the liner with a hot medium such as steam. Limitations of this method include the length of time the process takes to complete and the difficulty in completely unfolding the folded tube. Furthermore, it is difficult to apply the hot medium in a manner that causes uniform unfolding of the folded tube. For example, if the medium is introduced at one end of the tube, heat losses along the tube can prevent unfolding of the tube distant from the point of medium introduction.

Another method involves swaging a thermoplastic liner to heat it and temporarily decrease its outside diameter, inserting the swaged liner into the pipeline to be lined and then allowing the liner to cool and increase in diameter. Limitations of this method include the length of time the process takes to complete (up to six hours for each pipeline segment) and the difficulties associated with the decrease in liner length that occurs as the liner's diameter increases upon cooling.

Other lining methods involve either pulling or pushing into a pipeline a thermoplastic liner having an outside diameter significantly less than the inside diameter of the pipeline to be lined. Such liners may be prefabricated or fabricated on site. Typically, a cementous material and/or adhesive such as Portland cement grout or a plastic foam is then installed in the annular space between the liner and the pipeline. Such lining methods have the limitation of significantly reducing the inside diameter of the lined pipeline. Furthermore, an additional lining step after installation of the line tube is involved which increases the cost of the process and the time the pipeline must be kept out of service for repair.

At least one prior art method of extruding a liner into new, uninstalled pipe segments has been proposed. With this method, the pipe segments cannot be out of round (i.e., exhibit a varying ovality) because the extrusion die is configured to produce a tubular liner having essentially a single outside diameter that is the same as the inside diameter of a pipeline. This limitation effectively eliminates the method as one appropriate for rehabilitating existing pipelines that have become deformed (oval) in shape or existing pipelines comprised of pipe segments with ends that have shifted laterally with respect to one another. Moreover, the method does not provide flexible means of conveying melted liner material (melt) from the extruder to the extrusion die head and requires that the pipe segment be moved relative to a stationary die head rather than vice versa. The method further relies on the pipe segment being competent with no cracks or leaks and is thus inappropriate for use as an in situ pipeline rehabilitation method.

THE NATURE OF THE PRESENT INVENTION

The present invention provides a method and apparatus for in situ rehabilitation of pipelines. It involves extruding a hollow tube of thermoplastic liner material within and into the interior of an existing, installed pipeline. Because pipelines in need of rehabilitation have often lost their original circular cross sectional shape and/or have joints that are misaligned, the extruded tube has a cross-sectional area and/or diameter less than that of the pipeline. Thus, the hot, relatively soft tube is initially smaller than the pipeline. After the tube is extruded, it is expanded so that its outer surface is configured to fit against the inner surface of the pipeline. In a preferred embodiment, no adhesive is applied to either the inside surface of the pipeline or the outside surface of the tube. The expansion may be accomplished by the normal diameter swell which occurs subsequent to extrusion of thermoplastic materials and/or it may be accomplished by introducing a relatively cool, pressurized fluid, such as air or water, into the interior of the hollow tube. In the instance of pressurized fluid introduction, the pressure exerted by the pressurized fluid acts on the inner surface of the tube to cause expansion (essentially blow molding) of the relatively soft tube material. Upon contact of the outer surface of the tube with the inner surface of the pipeline, cooling and hardening of the liner occurs. The pressurized fluid, being relatively cooler than the tube, may also act to cool and harden the liner.

In a broad sense, the invention is a process for lining the interior of a pipeline in situ comprising the steps of extruding a tube of thermoplastic liner material within the interior of said pipeline, said tube being generally circular in cross section and said tube having an outside diameter smaller than the inner diameter of said pipeline and expanding said tube so that the outer diameter of said tube is essentially equal to the inner diameter of said pipeline.

In a broad sense, the best mode of the process comprises the steps of:

melting and pressurizing a thermoplastic to produce a pressurized melt, conveying the melt to a point of extrusion in a pipeline in situ, at said point of extrusion providing a movable extrusion die, moving said movable extrusion die in the in situ pipeline and simultaneously extruding a hot, tubular liner with an initial outside diameter less than the inside diameter of the pipeline into the interior of the pipeline, expanding said hot tubular liner such that the final outside diameter of the liner is approximately equal to the inside diameter of the pipeline, and cooling the tubular liner.

It may be necessary to prepare an existing pipeline for rehabilitation by lining. Preparation activities may include cleaning with a highly pressurized water jet, root removal, filling of large cracks with grout and/or replacement of pipe segments that have collapsed to such a degree that lining is impractical.

The liner material is an integral part of the liner system. While a variety of potential inner materials can be extruded, the preferred mode of this invention involves the use of thermoplastics. Thermoplastics melt on heating, solidify on cooling and may undergo these changes repeatedly. They may be differentiated from the other class of plastics, thermosets, in that thermosets are chemically reactive in their fluid condition and harden by further reaction. Subsequent heating may soften the structure of thermosets somewhat, but cannot restore their ability to flow. Thermoplastics exhibit relatively high strength and much greater elongation before breaking then thermosets. A number of thermoplastics are relatively low in cost. As cost is a primary criteria for selecting a liner material, "commodity" plastics are the preferred liner material for the present invention. Thermoplastics appropriate for in situ pipeline rehabilitation using the present invention include polyvinyl chloride (PVC), acrylonitrile-butadiene-styrene (ABS), high density polyethylene (HDPE) and polypropylene (PP). HDPE and PP are favored because they are relatively heat stable (i.e., their mechanical properties do not significantly degrade during extended, high temperature processing) and because their viscosities at typical processing temperatures are relatively low.

Liner initiation and termination require special attention, in that the shape and quality of an extruded liner produced at these times is difficult to control. Furthermore, the embodiments of the invention that involve pressurizing the interior of the liner tube, liner initiation means and/or liner termination means may also serve as bulkheads at the ends of the tube to prevent escape of the pressurized fluid at those locations.

The preferred liner initiation means is a hardened piece of the same thermoplastic materials as the liner having a diameter slightly less than the pipeline inside diameter. The piece of thermoplastic may take the form of a short, hollow pipe having a disk welded across one end or it may take the shape of a disk or cap having an outer diameter slightly less than the inner diameter of the pipeline. During liner initiation, the tube of liner material welds to the liner initiation means. The liner initiation means is cut out of the pipe after the liner has hardened.

In one embodiment, liner termination is achieved by halting the movement and heating of the movable extrusion die and allowing the melt to harden. In this case, a cooling extrusion die serves as the liner termination means. In an alternative embodiment, the terminal end of the liner tube is sealed by folding or collapsing the tube on itself or by allowing the end of the tube to weld to a piece of the same thermoplastic. At least the portion of the liner termination means that would impede flow through the pipeline is removed prior to reactivation of the pipeline.

The liner material is melted and pressurized by an extruder/molten polymer pump. In one embodiment, a single- or multiple-screw extruder is used to melt and mix the polymer. A gear pump may be provided downstream from the extruder to increase the pressure of the melt or to stabilized the melt flow rate. The extruder may be fitted with a heated hopper to preheat the thermoplastic.

Plastic is conveyed to the point of liner profile extrusion either in a molten state or in a solid state. While pneumatic conveyance of pelletized plastic beads is feasible, the best mode calls for conveying polymer from the extruder to the movable die head in the molten state through a flexible, heated hose.

In the best mode, the movable extrusion die has an outside diameter of no more than about 90 percent of the pipeline inside diameter. There are three basic types of dies capable of producing a seamless, annular cross section in this application. They are the center-fed mandrel support die, the screen pack die, and the spiral mandrel die.

The outer-fed mandrel die (also called the spider-supported mandrel die or the supporting ring die) transforms the melt stream, supplied to it in a circular cross section, into an annular stream. The central mandrel portion of the die is supported either by spider plate or a screen plate. The flow channels in the plate are generally oriented parallel to the axis of the extruded pipe. The ratio of the mandrel support diameter to the exit diameter is typically about 2.0 for polyethylene.

The screen pack die is used primarily for extruding large polyolefin pipes. The melt entering the die impinges on a cone-shaped torpedo that diverts it radially. As the melt moves outward, it passes through a tubular perforated body connected on upstream end to the extruder body and on its downstream end to the mandrel. The tubular perforated body is termed the "screen pack" as it contains many small (1.0 to 2.4 mm diameter) holes. After the melt flows through the screen pack it is diverted back to the axial direction. It then flows through a parallel die land prior to discharge.

A screen pack die is capable of producing a relative small total pressure loss at normal melt viscosities and pipe production rates. Obviously, much smaller pressure losses would be associated with liner production rates that are less than one tenth of pipe production rates. For safety reasons, however, such dies are designed for pressures up to 4,400 psi. Furthermore, such dies can be built more compactly then centerfed mandrel support die in that a ratio of mandrel exit diameter to screen pack diameter of 1.4 is possible. As a result, screen pack dies can be much lighter than other designs.

In the spiral mandrel die, the melt is first divided into several separate streams. The melt is thus distributed into spiral-shaped channels that are machined into the mandrel. In the direction of melt flow, the depth of the channels decreases and gap between the mandrel and the outer part of the die increases. Spiral mandrel die systems are advantageous in that flow marks are avoided. Furthermore, relatively low pressure drops are possible.

In the preferred embodiment, a screen pack die design is used and the temperature of the outer die ring is controlled. The holes in the screen pack are staggered to minimize reductions in melt strength due to weld lines. The outside diameter of the die gap is less than the inside diameter of the pipeline to allow for the outer die ring and a means of heating it, such as a bound heater. In that extruded thermoplastics profiles increase in diameter (diameter swell) and increase in thickness (thickness swell) upon leaving a die, some increase in tube diameter and thickness occurs due to this phenomenon. Both diameter swell and thickness will typically increase with shear rate in the die. In that shear rate increases with extrusion rate and decreases with die land length, swell ratios can be controlled to produce a tube of uniform diameter and thickness.

A die positioning system is used to position the movable extrusion die longitudinally and transversely in the pipeline. Longitudinally, the positioning system moves the die through the pipeline at a relatively constant rate as the liner tube is extruded. Transversely, the system keeps the die centrally located in the pipeline cross-section. In the preferred embodiment, skids constructed of spring steel are used to position the die transversely and either cables (e.g., steel braided wire) or the heated hose and one or two precision winches are used to position the die longitudinally.

Means are also provided to expand the liner tube and, in some embodiments, to cool it. In the preferred embodiment, pressurized air, introduced to the interior of the liner tube through the body of the movable extrusion die is the primary means used to expand the liner. Cooling occurs by conduction of heat into the wall of the pipeline.

The present invention overcomes the limitations of prior art lining methods and devices by providing an inexpensive, rapidly installed and relatively ductile liner that does not significantly reduce the inside diameter of the lined pipeline. It is an object of the present invention to reduce the cost of rehabilitating underground pipelines. It is a further object to reduce the time such pipelines must be kept out of service in order to rehabilitate them. It is another object to provide a relatively ductile liner that would be capable of a significant amount of plastic deformation under tension prior to breaking should the lined pipeline shift or shear. Another object is to provide a means for extruding a liner within a pipeline and expanding it to substantially fit against the inside surface of the pipeline. Further objects and advantages of my invention will become apparent from a consideration of the drawings and ensuing description of it.

DETAILED DESCRIPTION

Figure 1:
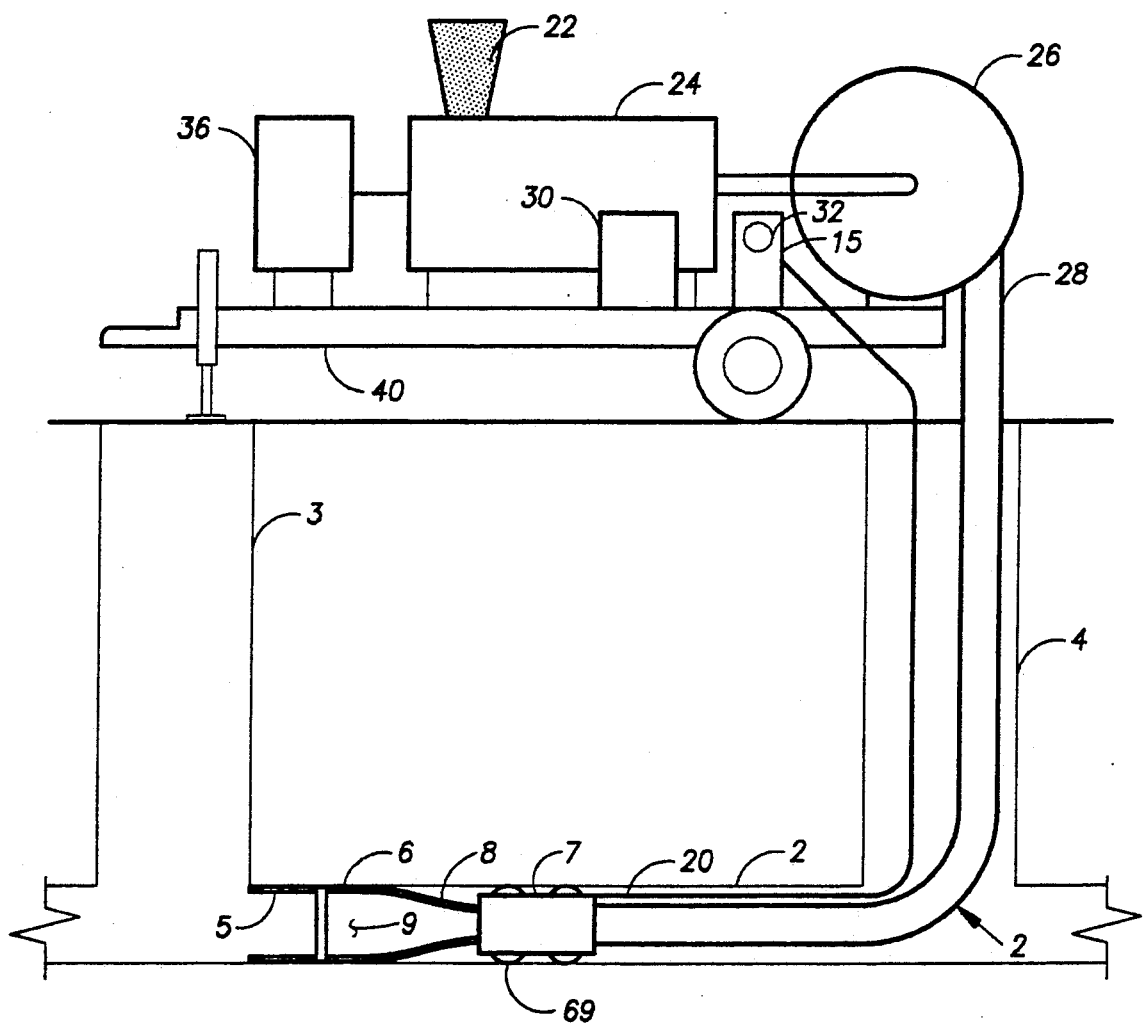
FIG. 1 is a schematic drawing of the system installing a liner in a pipeline.

Referring to FIG. 1, apparatus 1 is being used to rehabilitate sewer pipeline 2 between two manholes 3 and 4. Segment 5 of thermoplastic pipe is secured in pipeline 2 at manhole 3 which is the point to initiation of liner 6. Movable extrusion die 7 extrudes tube 8 of liner material that welds to segment 5 forming plenum 9. Plenum 9 is pressurized with air to a pressure of 0.1 to 10 pounds per square inch gauge. The air is pressurized by compressor 15 and delivered via tubing 20 and through die 7 into plenum 9.

Liner material 22 is melted and pressurized by extruder 24 and pumped through the body of winch 26 into heated hose 28. Electricity for heat hose 28 is provided by power source 30. Winch 26 is used to position movable die 7 longitudinally in pipeline 2 by taking up heated hose 28 at a relatively constant rate. The rate of movement of die 7 may be varied in response to changes in the pressure in plenum 9 sensed by gauge 32.

Motive power is supplied to extruded 24 by motor 36 which may be an electric motor or an internal combustion engine. In an alternative embodiment, motor 36 is used to pressurize hydraulic fluid which is, in turn, used to drive hydraulic motors attached to extruder 24, winch 26 and compressor 15. System components may be transported to the site of liner installation on trailer 40.

Figure 2:
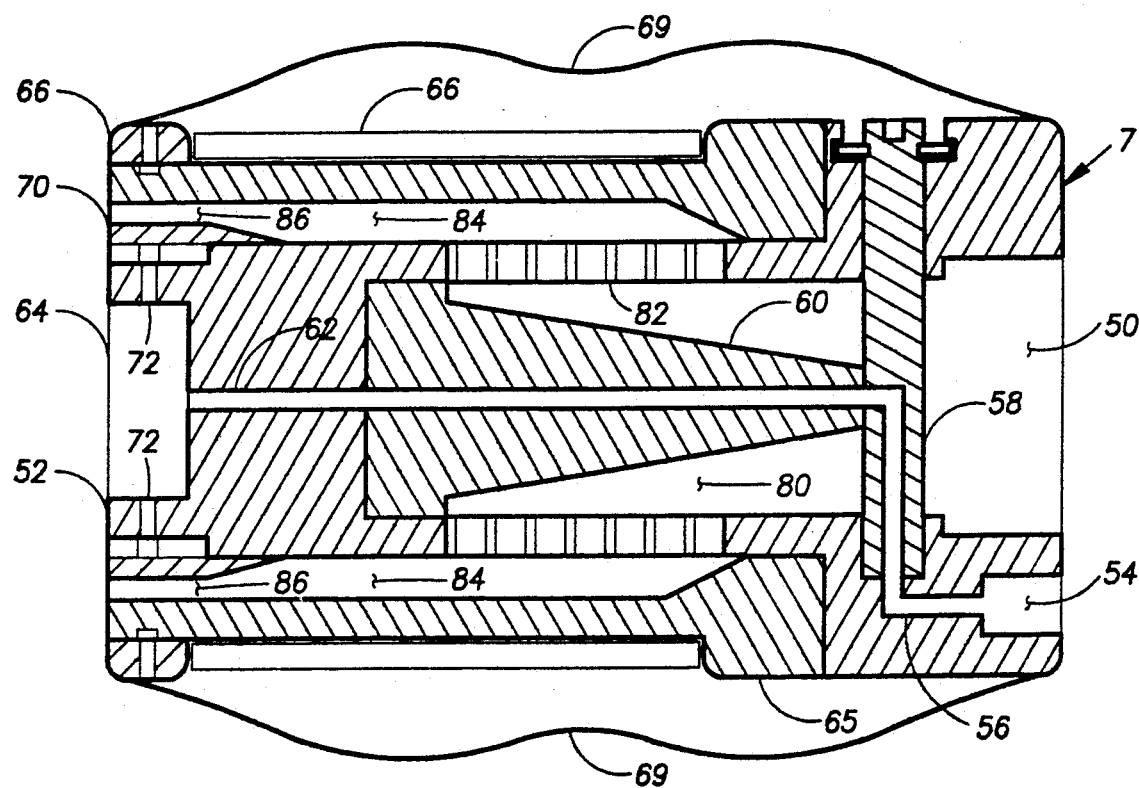
FIG. 2 shows the movable extrusion die in cross section.

Referring to FIG. 2, movable extrusion die 7 is shown in cross section. Movable extrusion die 7 connects to heated hose 28 (not shown) by means of female threaded portion 50 of mandrel 52. Pressurized air enters mandrel 52 via hose fitting 54 and travels through mandrel 52 in first passageway 56. Air tube 58 serves to convey the pressurized air to torpedo 60 from whence it flows through second passageway 62 out of the extruding end 64 of movable extrusion die 7. Outer die ring 65 is attached to mandrel 52 with bolts. Band heater 66 is secured to outer die ring 64 by ring 68. Die 7 is centered in pipeline 2 by six skids 69. Inner die lands portion 70 is attached to mandrel 52 by set screws 72.

Thermoplastic melt is introduced to movable extrusion die 7 by heated hose 28 (not shown). The melt flows around air tube 58, and through conduit 80, screen pack holes 82, annular space 84, and die lands 86. Movement through die 7 transforms the melt stream into a tube 8 of molten thermoplastic. As tube 8 leaves die 7, its diameter and thickness are increased somewhat by die swell. The pressurized air introduced to the plenum 9 inside tube 8 expands tube 8 to form liner 6. The outside surface of which is configured to fit against the inside surface of pipeline 2.

Prior to operating apparatus 1 in pipeline 2, pipeline 2 is cleaned using conventional means. To operate apparatus 1, first extruder 24, winch 26, heated hose 28 and die 7 are heated to about 250° C. Pipe segment 5 is secured at the point on pipeline 2 at which liner initiation is to occur. Die 7 is positioned in pipeline 2 adjacent segment 5 using heated hose 28 as a longitudinal positioning means. Extruder 24 is then used to melt and pressurize thermoplastic liner material 22 which then flows through winch 26, heated hose 28 and die 7. When tube 8 is initially extruded, it welds to segment 5. Movable extrusion die 7 is then moved away from segment 5 and air is introduced to plenum 9 at a rate that causes tube 8 to expand and its outer surface to fit against the inner surface of pipeline 2. Liner 6 cools and hardens as its heat is conducted into pipeline 2.

When pipeline 2 is completely lined, die 7 enters manhole 4. At this point, liner 6 is terminated by allowing die 7 to cool. Alternatively, the terminal end of the liner 6 may be allowed to weld to a second pipe segment (not shown). In the preferred embodiment, during the subsequent cooling and hardening of liner 6, a constant air pressure is maintained in plenum 9. After liner 6 has hardened, the portions of the liner initiation means and the liner termination means that would interfere with flow in pipeline 2 are removed by cutting, reaming or boring.

Many variations of the invention will occur to those skilled in the art. All such variations within the scope of the claims are intended to be within the scope and spirit of the invention.

I claim:

1. A pipelining process comprising the steps of:

melting and pressurizing a thermoplastic to produce a pressurized melt, conveying the melt in a flexible hose to a movable extrusion die in a stationary pipeline in situ, moving said movable extrusion die in the stationary pipeline and simultaneously extruding a hot, tubular liner with an initial outside diameter less than the inside diameter of the pipeline into the interior of the pipeline, concurrent with said extruding, expanding said hot tubular liner by delivering a compressed fluid to the interior of the liner through the movable extrusion die such that the diameter of the liner is enlarged until it conforms approximately to the inside surface of the pipeline, and allowing the tubular liner to cool.

2. An apparatus for installing a liner of thermoplastic liner material in a pipe in situ comprising means for melting and pumping a thermoplastic material whereby said liner material is pressurized, a movable extrusion die movable along a pipe in situ for extruding said liner material in an initial tubular shape as said die is moved along said pipe, means for moving said movable extrusion die, flexible means for conveying said liner material from said means for melting and conveying thermoplastic material to said extrusion die, means for spacing said movable extrusion die from the interior of said pipe, and means for expanding said liner from said initial tubular shape to substantially configure said liner to fit the inside cross-sectional shape of said pipe, wherein the means for expanding said liner comprises an air tube through the movable extrusion die.

* * * * *